United States Patent
Murakami et al.

(10) Patent No.: US 8,855,182 B2
(45) Date of Patent: Oct. 7, 2014

(54) OPTIMIZATION METHOD OF OPTIMALLY SETTING EMPHASIS AND OPTIMIZATION DEVICE FOR OPTIMALLY SETTING EMPHASIS

(71) Applicants: Takashi Murakami, Atsugi (JP); Kosuke Sasaki, Atsugi (JP); Ken Mochizuki, Atsugi (JP)

(72) Inventors: Takashi Murakami, Atsugi (JP); Kosuke Sasaki, Atsugi (JP); Ken Mochizuki, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 13/826,782

(22) Filed: Mar. 14, 2013

(65) Prior Publication Data

US 2013/0251015 A1    Sep. 26, 2013

(30) Foreign Application Priority Data

Mar. 26, 2012  (JP) ................. 2012-069528

(51) Int. Cl.
 *H04L 1/00*    (2006.01)
(52) U.S. Cl.
 CPC .................. *H04L 1/0033* (2013.01)
 USPC ........... 375/224; 375/295; 375/296; 375/297; 375/227; 455/114.3; 455/115.1; 455/115.2; 455/115.3; 455/115.4; 455/114.2; 455/43

(58) Field of Classification Search
 USPC ............... 375/224, 295, 296, 297, 227; 455/114.3, 115.1, 115.2, 115.3, 115.4, 455/114.2, 43
 See application file for complete search history.

(56) References Cited

U.S. PATENT DOCUMENTS

| | | | |
|---|---|---|---|
| 6,252,914 B1 * | 6/2001 | Yamamoto | 375/296 |
| 8,391,413 B2 * | 3/2013 | Mantravadi et al. | 375/316 |
| 8,649,446 B2 * | 2/2014 | Kim et al. | 375/259 |
| 2002/0044014 A1 * | 4/2002 | Wright et al. | 330/2 |
| 2008/0267320 A1 * | 10/2008 | Dateki | 375/316 |

FOREIGN PATENT DOCUMENTS

JP    2008-271552    11/2008

* cited by examiner

*Primary Examiner* — Siu Lee
(74) *Attorney, Agent, or Firm* — Greer Burns & Crain Ltd.

(57) ABSTRACT

In an emphasis optimization device, a calculating unit calculates an inverse characteristic of an amplitude characteristic based on the amplitude characteristic of a transmission path, and an inverse Fourier transform unit performs an inverse Fourier transform on the inverse characteristic to obtain an impulse response. An extracting unit extracts, from the obtained impulse response, an impulse response corresponding to the number of taps necessary for emphasis to be added to a digital signal to be transmitted on the transmission path. An emphasis amount calculating unit converts the extracted impulse response into a value of the emphasis to calculate an emphasis amount.

6 Claims, 3 Drawing Sheets

OPTIMIZATION METHOD OF OPTIMALLY SETTING EMPHASIS AND OPTIMIZATION DEVICE FOR OPTIMALLY SETTING EMPHASIS

CROSS-REFERENCE TO RELATED APPLICATIONS

This application is based upon and claims the benefit of priority from prior Japanese Patent Application No. 2012-069528, filed Mar. 26, 2012, the entire contents of which are incorporated herein by reference.

BACKGROUND OF THE INVENTION

1. Field of the Invention

The present invention relates to an optimization method of optimally setting an emphasis and an optimization device for optimally setting an emphasis. In particular, the invention relates to an emphasis optimization device and an emphasis optimization method, in which a transmission path (excluding active devices) including various kinds of passive devices, for example, cables, connectors, filters, fixed attenuators, and the like is targeted, and through which it is possible to optimize an emphasis setting value added to a digital signal to be transmitted on the transmission path (the target system).

2. Description of the Related Art

In recent years, as digital communication increases in speed, ultrahigh-speed digital signals, for example, having a transmission rate of 25 Gbit/s, are commonly transmitted on the high-speed connectors connecting printed-circuit boards (PCBs) or platforms.

However, in the case where the ultrahigh-speed digital signals of a transmission rate of 25 Gbit/s as described above are transmitted on the transmission paths such as the PCBs and the high-speed connectors, an error may occur as the transmission path is lengthened. Further, transmission loss may occur due to the deficiency in the transmission bandwidth and thus the distortion of waveforms becomes large. Therefore, there is a problem in that the communication qualities are degraded. In recent years, as a solution for improving the communication qualities, an emphasis is added to the digital signal.

For example, as a method of generating an emphasis to be added to the digital signal, Jpn. Pat. Appln. KOKAI Publication No. 2008-271552 discloses an adaptive pre-emphasis device and the method thereof. In the device and the method disclosed in the KOKAI Publication No. 2008-271552, an input file including digital data representing a digital-data-pattern waveform is received and is subjected to pre-emphasis process. This pre-emphasis process comprises up-sampling the digital data at a rate of Fs/Fd, generating a step response using the up-sampled digital data, differentiating the generated step response, generating a pre-emphasis•filtering coefficient, convolving the coefficient and the received digital-data-pattern waveform input signal, and generating a pre-emphasized digital-data-pattern. According to the method, it is realized that the signals pre-emphasized by various kinds of data generating devices are generated.

However, even in a case of the above-mentioned pre-emphasis or a de-emphasis, the level of the quality improvement achieved by adding the emphasis to the digital signal varies greatly depending on a tap width and an intensity value (a modulation depth) for every tap.

By the way, in a case where the emphasis is added to the digital signal to be transmitted on the transmission path, it is necessary to set an optimal value by determining the tap width and the intensity value (the modulation depth) for every tap. Further, there are two kinds of emphasis; the pre-emphasis in which when the emphasis is added, the signal is transmitted on the transmission path by adding the emphasis at a sender in advance so as to improve the waveform quality at a receiver; and the de-emphasis in which the emphasis is added immediately before the signal is received so as to improve the waveform quality immediately before the reception.

Furthermore, optimal setting values of the emphasis are different depending on applied systems. For this reason, in order to apply the emphasis, there are cumbersome works which involve setting respective parameters, searching for an optimal value of the emphasis while monitoring the waveform and the BER (Bit Error Rate), and setting the tap width and the intensity value (the modulation depth) for each tap.

BRIEF SUMMARY OF THE INVENTION

An object of the invention is to provide an emphasis optimization device and an emphasis optimization method, through which an optimal setting value of an emphasis can be obtained without involving cumbersome works in the related art.

According to a first aspect of the invention, there is provided an emphasis optimization device comprising: an inverse characteristic calculating unit which calculates an inverse characteristic of an amplitude characteristic based on the amplitude characteristic of a transmission path; an inverse Fourier transform unit which performs an inverse Fourier transform on the inverse characteristic of the amplitude characteristic of the transmission path to obtain an impulse response; an impulse response extracting unit which extract, from the obtained impulse response, an impulse response corresponding to the number of taps necessary for emphasis to be added to a digital signal to be transmitted on the transmission path; and an emphasis amount calculating unit which converts the extracted impulse response into a value of the emphasis to calculate an emphasis amount.

According to a second aspect of the invention, there is provided an emphasis optimization method comprising: calculating an inverse characteristic of an amplitude characteristic based on the amplitude characteristic of a transmission path; performing an inverse Fourier transform on the inverse characteristic of the amplitude characteristic of the transmission path to obtain an impulse response; extracting, from the impulse response, an impulse response corresponding to the number of taps necessary for emphasis to be added to a digital signal to be transmitted on the transmission path; and converting the extracted impulse response into a value of the emphasis to calculate an emphasis amount.

According to the device and the method of an embodiment of the invention, as long as only the amplitude characteristic of a transmission path in a target system can be measured, it is possible to instantly obtain the theoretically optimal setting value as the emphasis which is added to a digital signal to be transmitted on the transmission path. Therefore, it is possible to achieve the optimization in the setting value of the emphasis which is added to the digital signal to be transmitted on the transmission path in the target system without involving cumbersome works for searching for the optimal setting value of the emphasis in the related art.

DETAILED DESCRIPTION OF THE INVENTION

Hereinafter, an embodiment of the invention will be described in detail with reference to the accompanying drawings.

A device configured to optimize a setting value of emphasis and a method of optimizing the setting value of emphasis according to the embodiment of the invention is targeted at a transmission path (excluding active devices) which includes various kinds of passive devices, for example, cables, connectors, filters, fixed attenuators, and the like as a target system. Further, it is possible to optimize a setting value added to an emphasis digital signal to be transmitted on the transmission path in the target system.

An emphasis is performed on a plurality of bits (2 to 4 bits in general), which is a technology of filtering waveforms through emphasizing all the waveforms in a unit of bit and may be considered as a kind of digital filter. For example, in a case where the emphasis is performed for every 3 bit wide, it is considered that the digital filter is a 4-tap digital filter having a 1-bit delay.

Figure 2:
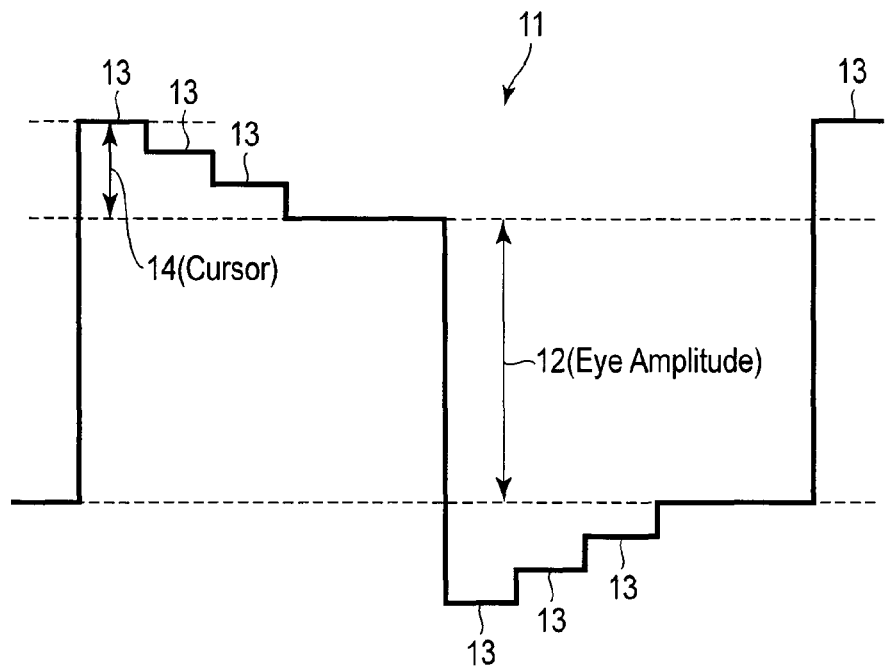
FIG. 2 is a waveform diagram illustrating the emphasis waveform of FIG. 1.

FIG. 2 is an explanatory diagram of an emphasis waveform, and illustrates an example of a pre-emphasis waveform image, in which the horizontal axis represents a time and the vertical axis represents a modulation depth. In the pre-emphasis waveform image 11, bits can be emphasized by increasing or decreasing an amplitude amount with respect to an Eye-Amplitude 12 which is an amplitude voltage value of a reference waveform (i.e. a rectangular wave), and these emphasized places are referred to as taps 13. In the example illustrated in FIG. 2, six taps 13 within the repetition period of the waveform are provided with movable cursors 14. The modulation depth (i.e. an emphasis intensity value) of each cursor 14 for every tap 13 is an amplitude amount (i.e. a variation amount) which increases or decreases in a predetermined range depending on the level of pre-emphasis with respect to the amplitude voltage value of the reference waveform.

In a case where the emphasis is considered as a digital filter, the setting value which is an inverse characteristic of the transmission path (i.e. the target system) becomes an optimized value, and thus it can be considered as the most effective way.

In the embodiment of the invention, the optimization in the setting value of emphasis is achieved through the following processes (1) to (4) using an amplitude characteristic of the transmission path (the target system) as input data.

(1) An inverse amplitude characteristic of the transmission path is calculated based on the input data (i.e. the amplitude characteristic of the transmission path).

(2) The calculated inverse characteristic is subjected to the inverse Fourier transformation to obtain an optimum impulse response.

(3) The obtained impulse response is extracted by the number of taps of the emphasis.

(4) An optimal value of the emphasis is calculated based on the extracted impulse response.

Figure 1:
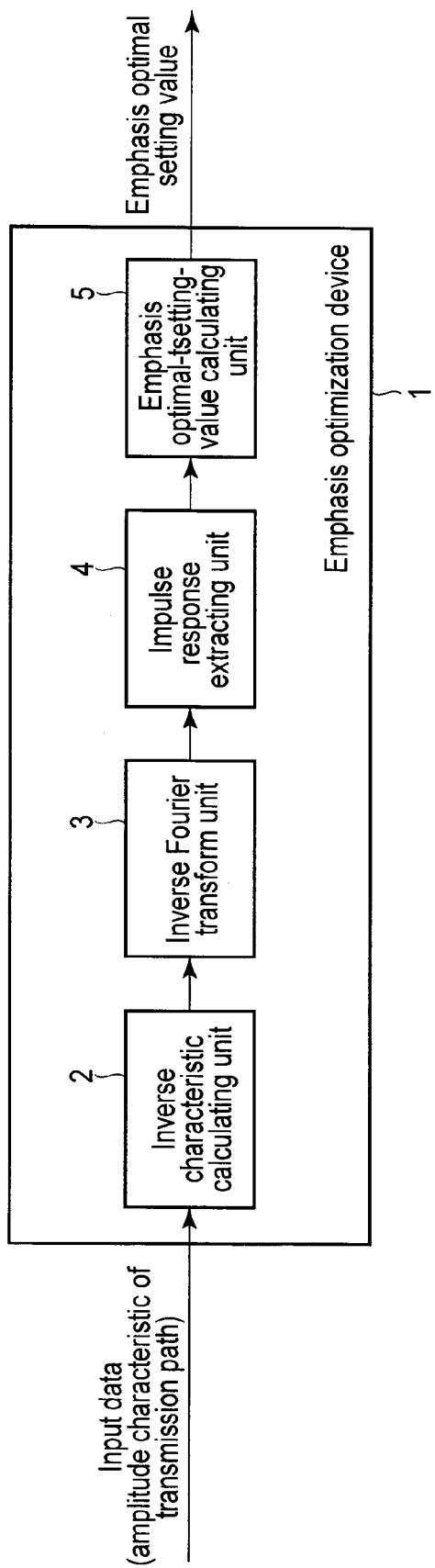
FIG. 1 is a block diagram schematically illustrating the configuration of a device which optimizes the setting value of emphasis according to an embodiment of the invention.

As illustrated in FIG. 1, an emphasis optimization device 1 according to the embodiment of the invention includes, as functional units optimizing the setting value of the emphasis, an inverse characteristic calculating unit 2, an inverse Fourier transform unit 3, an impulse response extracting unit 4, and an emphasis optimal-setting-value calculating unit 5.

The inverse characteristic calculating unit 2 receives the amplitude characteristic of the transmission path in the target system, and calculates the inverse characteristic of the amplitude characteristic of the input transmission path. Specifically, assuming H(f) as the amplitude characteristic of the transmission path in the target optimization system, the inverse characteristic of the amplitude characteristic of the transmission path in the target system can be calculated by obtaining 1/H(f).

Herein, in a case where actual measurement values obtained in advance and data are published regarding the amplitude characteristic of the transmission path in the target system, which is input to the inverse characteristic calculating unit 2, the data (i.e. the amplitude characteristic) is input based on these numeral values.

Further, the emphasis optimization device 1 according to the embodiment may be additionally configured to include a function of measuring the amplitude characteristic of the transmission path in the target system to input the measured amplitude characteristic of the transmission path to the inverse characteristic calculating unit 2. With this configuration, it is possible to realize a set of functions from the measuring of the amplitude characteristic (the necessary input value) of the transmission path in the target system to the final confirming of the waveform by using a single emphasis optimization device 1. Therefore, the optimal setting value of the emphasis can be verified through significantly simplified steps.

The inverse Fourier transform unit 3 performs the inverse Fourier transform on the inverse characteristic of the amplitude characteristic of the transmission path in the target system to obtain an optimal impulse response, wherein the inverse characteristic is calculated in the inverse characteristic calculating unit 2. Specifically, assuming G(f) as the inverse characteristic 1/H(f) of the amplitude characteristic of the transmission path in the target system, wherein the inverse characteristic 1/H(f) is calculated in the inverse characteristic calculating unit 2, the optimal impulse response of the inverse characteristic of the amplitude characteristic of the transmission path in the target system can be obtained by obtaining $F-1\{G(f)\}$.

The impulse response extracting unit 4 extract, from the impulse response obtained by the inverse Fourier transform unit 3, an amount of the impulse response corresponding to the taps necessary for the desired emphasis. Since the impulse response obtained by the inverse Fourier transform unit 3 is longer than a range covering the number of taps necessary for the desired emphasis, the impulse response just as much as an actually necessary amount of taps is extracted.

The emphasis optimal-setting-value calculating unit 5 calculates the optimal setting value based on the impulse response extracted by the impulse response extracting unit 4. Specifically, the emphasis value can be uniquely obtained from the impulse response value which is extracted in the impulse response extracting unit 4. In other word, an amount of the impulse response corresponding to the taps necessary for the desired emphasis is extracted as the emphasis value by multiplying the rectangle window function to the impulse response.

Next, a method of optimizing the emphasis will be described using the emphasis optimization device 1 configured as described above, in which the optimal setting value of the emphasis added to a digital signal which is transmitted on the transmission path in the target system is calculated.

Figure 3:
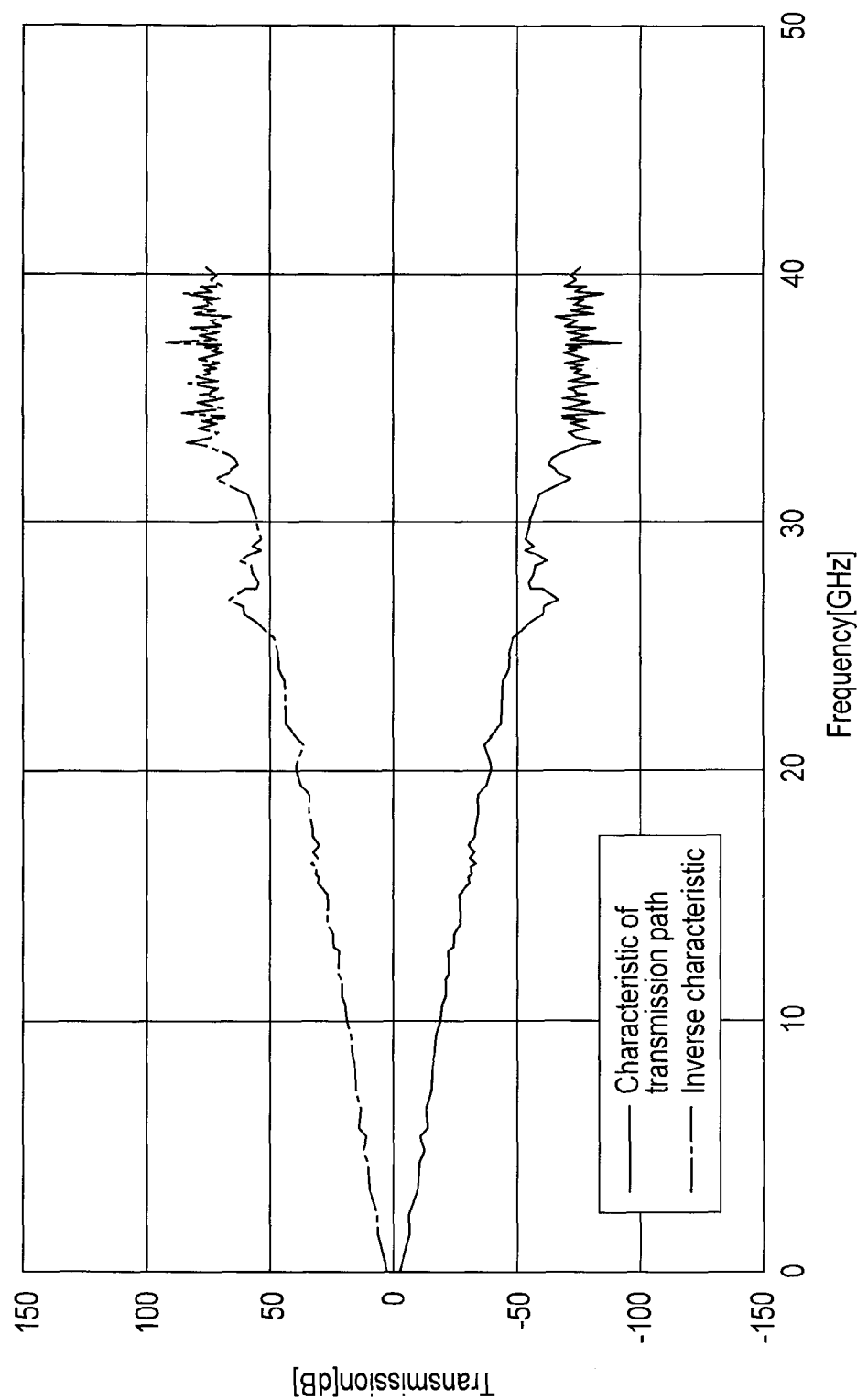
FIG. 3 is a diagram illustrating an example of an inverse characteristic of a transmission path which is calculated by the device configured to optimize the setting value of emphasis and a method of optimizing the setting value of emphasis according to the embodiment of the invention.

Step 1: using the inverse characteristic calculating unit 2, the inverse characteristic is calculated based on the input amplitude characteristic of the transmission path in the target system. For example, the amplitude characteristic of the transmission path in the target optimization system is assumed to be expressed by a waveform depicted with the solid line in FIG. 3. In this case, assuming H(f) as the amplitude characteristic of the transmission path, the inverse characteristic of the amplitude characteristic of the transmission path in the target system can be calculated by obtaining 1/H (f).

Step 2: using the inverse Fourier transform unit 3, the inverse characteristic calculated in Step 1 is subjected to the inverse Fourier transform to obtain the optimal impulse response. Assuming G(f) as the inverse characteristic 1/H(f) calculated in Step 1, the optimal impulse response of the inverse characteristic can be obtained by calculating F−1{G (f)} through the inverse Fourier transform.

Figure 4:
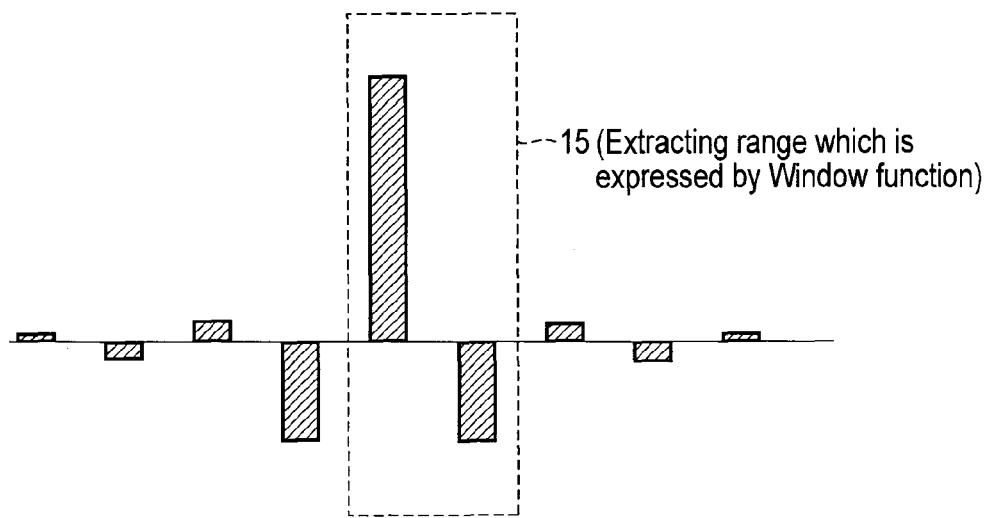
FIG. 4 is a diagram illustrating an impulse response which is calculated based on the inverse characteristic illustrated in FIG. 3.

Step 3: using the impulse response extracting unit 4, the impulse response as much as the number of taps necessary for the actual emphasis is extracted from the impulse response obtained in Step 2. For example, FIG. 4 illustrates an example of the optimal impulse response obtained in Step 2. Since the optimal impulse response is longer than a range covering the number of taps necessary for the desired emphasis, the impulse response just as much as the actually necessary taps is extracted. The example of FIG. 4 illustrates the case of a 2-tap emphasis. In the example of FIG. 4, since only a fundamental waveform and the primary impulse response value are necessary, the impulse response in a extracting range 15 surrounded by the dotted rectangular line in FIG. 4, which is expressed by a widow function, is extracted by the window function.

Step 4: using the emphasis optimal-setting-value calculating unit 5, the optimal setting value of the emphasis is calculated based on the impulse response extracted in Step 3. The impulse response obtained in Step 3 is converted into an emphasis value. Specifically, assuming $\alpha$ as the fundamental waveform and $\beta$ as the primary impulse response value of the impulse response in the extracting range 15 extracted in the example of FIG. 4, which is expressed by the widow function, the optimal setting value (dB) of the target emphasis is calculated by the expression of $20 \log \{(\alpha-\beta)/(\alpha+\beta)\}$.

Herein, as a specific numerical example, in a case where an emphasis of 2 Post/1 Pre is added to the digital signal with PRBS7 (Pseudo random binary sequence: pseudo random pattern) at 10 Gbits transmitted on the transmission path in the target system using the above-mentioned method, the calculated tap values of the emphasis are Post1=4.1 dB and Post2=−0.3 dB. These values become the optimal setting values for the addition of the emphasis.

As described above, according the emphasis optimization device and the emphasis optimization method of the invention, as long as only the amplitude characteristic of the transmission path in the target system can be measured, it is possible to instantly obtain the theoretically optimal setting value of the emphasis which is added to the digital signal to be transmitted on the transmission path. Therefore, it is possible to achieve the optimization in the setting value of the emphasis which is added to the digital signal to be transmitted on the transmission path in the target system without involving cumbersome works for searching for the optimal setting value of the emphasis in the related art.

In addition, the invention is not limited to the embodiment, and all the other aspects, examples, and operation technologies which are implementable by a person skilled in the art based on the embodiment will be belonged to the category of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An emphasis optimization device configured to add an emphasis to a digital signal transmitted on a transmission path which includes a passive device and excludes an active device, the emphasis optimization device comprising:
   an inverse characteristic calculating circuit configured to obtain amplitude characteristic (H(f): f is a frequency of the transmission path to calculate an inverse characteristic (G(f)) of the amplitude characteristic by an expression of G(f)=1/H(f);
   an inverse Fourier transform circuit configured to perform an inverse Fourier transform on the inverse characteristic of the amplitude characteristic of the transmission path to obtain an impulse response of the transmission path;
   an impulse response extracting circuit configured to extract a fundamental wave value and first to (n−1)th (n is an integer equal to or greater than one) impulse response values corresponding to n tap positions each being a position of the digital signal to which the emphasis is permitted to be added; and
   an emphasis amount calculating circuit configured to calculate n emphasis amounts based on the n extracted values.

2. The emphasis optimization device of claim 1, wherein the passive device includes at least one of a cable, a connector, a filter and a fixed attenuator.

3. The emphasis optimization device of claim 1, wherein when n=2, the emphasis amount calculating circuit calculates the emphasis amounts by $20 \log \{(\alpha-\beta)/(\alpha+\beta)\}$ (dB), assuming $\alpha$ as the fundamental wave value and $\beta$ as the first impulse response value.

4. An emphasis optimization method for adding an emphasis to a digital signal transmitted on a transmission path which includes a passive device and excludes an active device, the method comprising:
   obtaining an amplitude characteristic (H(f): f is a frequency) of the transmission path to calculate an inverse characteristic (G(f)) of the amplitude characteristic by an expression of G(f)=1/H(f);
   performing an inverse Fourier transform on the inverse characteristic of the amplitude characteristic of the transmission path to obtain an impulse response of the transmission path;
   extracting a fundamental wave value and first to (n−1)th (n is an integer equal to or greater than one) impulse response values corresponding to n tap positions each being a position of the digital signal to which the emphasis is permitted to be added; and
   calculating n emphasis amounts based on the n extracted values.

5. The emphasis optimization method of claim 4, wherein the passive device includes at least one of a cable, a connector, a filter and a fixed attenuator.

6. The emphasis optimization method of claim 4, wherein when n=2, the emphasis amounts are calculated by 20 log $\{(\alpha-\beta)/(\alpha+\beta)\}$ (dB) while $\alpha$ is assumed as the fundamental wave value and $\beta$ is assumed as the first impulse response value.

* * * * *

UNITED STATES PATENT AND TRADEMARK OFFICE
CERTIFICATE OF CORRECTION

PATENT NO.        : 8,855,182 B2
APPLICATION NO.   : 13/826782
DATED             : October 7, 2014
INVENTOR(S)       : Murakami et al.

It is certified that error appears in the above-identified patent and that said Letters Patent is hereby corrected as shown below:

In the Claims:

Col. 6, line 23, insert -- ) -- between "frequency" and "of".

Signed and Sealed this
Nineteenth Day of May, 2015

Michelle K. Lee
*Director of the United States Patent and Trademark Office*